United States Patent
Valle

(10) Patent No.: US 9,943,068 B2
(45) Date of Patent: Apr. 17, 2018

(54) PET TOY INFUSING DEVICE

(71) Applicant: Doskocil Manufacturing Company, Inc., Arlington, TX (US)

(72) Inventor: Andrea Valle, Stanhope, NJ (US)

(73) Assignee: LITTLE BIG CAT, INC., Beverly Hills, CA (US)

( * ) Notice: Subject to any disclaimer, the term of this patent is extended or adjusted under 35 U.S.C. 154(b) by 213 days.

(21) Appl. No.: 15/070,111

(22) Filed: Mar. 15, 2016

(65) Prior Publication Data

US 2017/0265434 A1 Sep. 21, 2017

(51) Int. Cl.
*A01K 15/02* (2006.01)

(52) U.S. Cl.
CPC .................. *A01K 15/025* (2013.01)

(58) Field of Classification Search
CPC ......... A61L 9/122; A61L 9/12; A01K 15/025; A01K 15/026
USPC ................. 119/711; 422/5.6, 26, 28, 124
See application file for complete search history.

(56) References Cited

U.S. PATENT DOCUMENTS

| | | | | |
|---|---|---|---|---|
| 5,970,643 A * | 10/1999 | Gawel, Jr. | ............... | A61L 9/122 239/51.5 |
| 6,106,786 A * | 8/2000 | Akahoshi | ................ | A61L 9/122 222/187 |
| 6,332,396 B1 * | 12/2001 | Palm | .................... | A23C 3/0375 422/26 |
| 6,800,015 B1 * | 10/2004 | Derges | .................... | A61L 9/042 239/211 |
| 7,670,035 B2 * | 3/2010 | Tsai | ........................ | F21S 6/001 362/161 |
| 2006/0150919 A1 * | 7/2006 | Thomason | ........... | A01K 15/026 119/710 |
| 2011/0148329 A1 * | 6/2011 | Demarest | ............ | A01M 1/2033 315/313 |
| 2017/0086426 A1 * | 3/2017 | Sica | ...................... | A01K 15/025 |
| 2017/0182200 A1 * | 6/2017 | McCavit | ................. | A61L 9/127 |

* cited by examiner

*Primary Examiner* — Yvonne R Abbott-Lewis
(74) *Attorney, Agent, or Firm* — Global IP Counselors, LLP

(57) ABSTRACT

A pet toy infusing device includes a base, a removeable cover and a porous insert. The base includes a cavity, and has an opening configured to enable access to the cavity. The removable cover is configured to cover the cavity. The porous insert is removably disposed inside of the cavity between the base and the cover, the porous insert having an interior surface defining a pet toy holding area, and being configured to prevent a material disposed inside the cavity of the base from entering the pet toy holding area, while enabling a pet toy disposed in the pet toy holding area to be infused with the material.

16 Claims, 10 Drawing Sheets

PET TOY INFUSING DEVICE

BACKGROUND

Field of the Invention

The present invention generally relates to a pet toy infusing device. In particular, the present invention relates to a device that quickly and effectively infuses a material to a pet toy without contaminating the toy.

Background Information

Some animals enjoying playing with toys that include an attractant, such as nepetalactone ("catnip"). Nepetalactone can used as a recreational substance for pet cats' enjoyment, and catnip and catnip-laced products designed for use with domesticated cats are available to consumers. Nepetalactone can be disposed inside or on the toy. Some toys can be refillable with the attractant.

SUMMARY

It has been found that overtime, the nepetalactone on or in a cat toy can be completely used up or become no longer effective. In such a circumstance it may be desired to marinate or infuse the toy with additional nepetalactone or catnip. Accordingly, in one embodiment, a pet toy infusing device includes a base, a removeable cover and a porous insert. The base includes a cavity, and has an opening configured to enable access to the cavity. The removable cover is configured to cover the cavity. The porous insert is removably disposed inside of the cavity between the base and the cover, the porous insert having an interior surface defining a pet toy holding area, and being configured to prevent a material disposed inside the cavity of the base from entering the pet toy holding area, while enabling a pet toy disposed in the pet toy holding area to be infused with the material.

BRIEF DESCRIPTION OF THE DRAWINGS

Referring now to the attached drawings which form a part of this original disclosure.

DETAILED DESCRIPTION OF EMBODIMENTS

Figure 1:
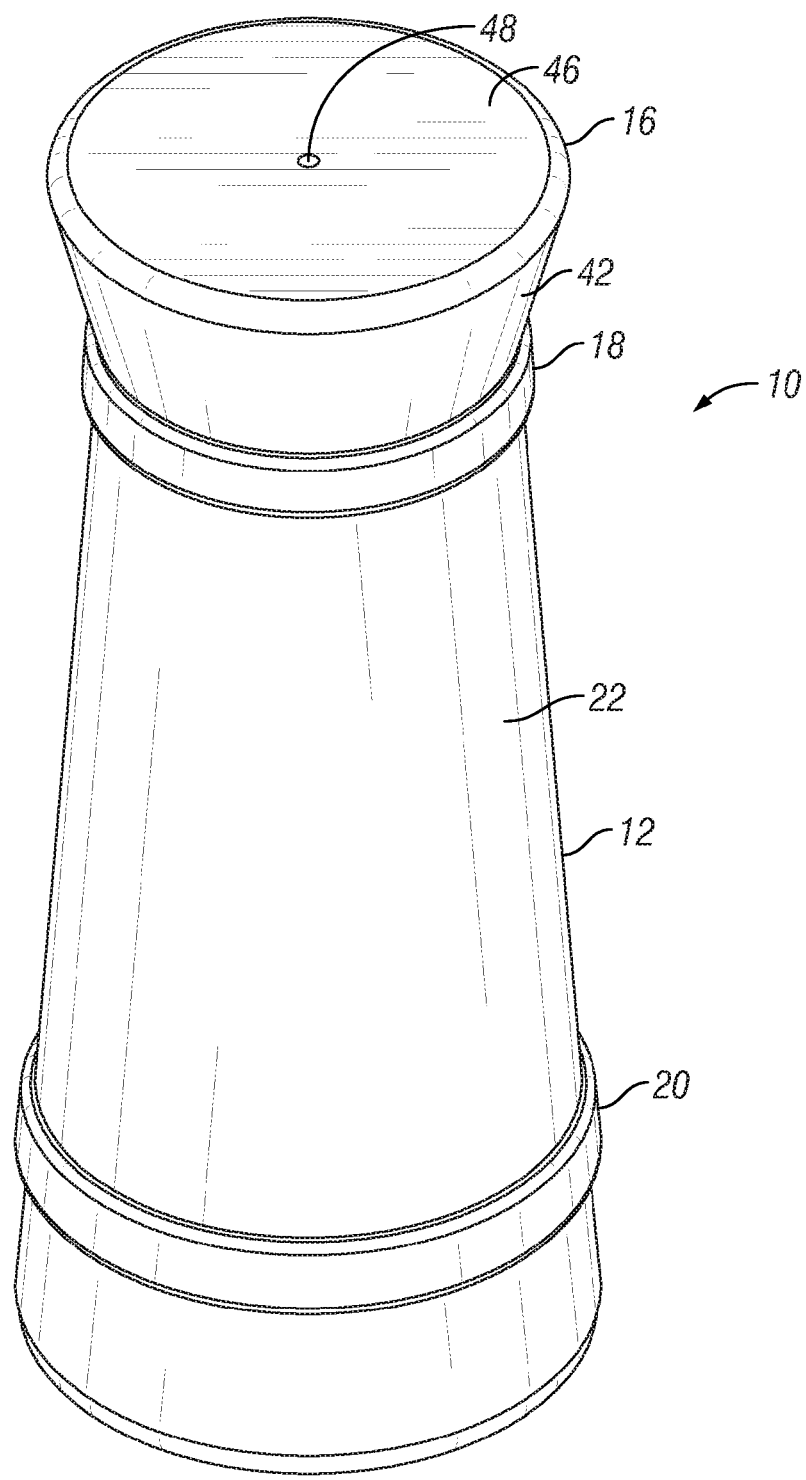
FIG. 1 is a top perspective view of a pet toy infusing device according to an embodiment.
Figure 2:
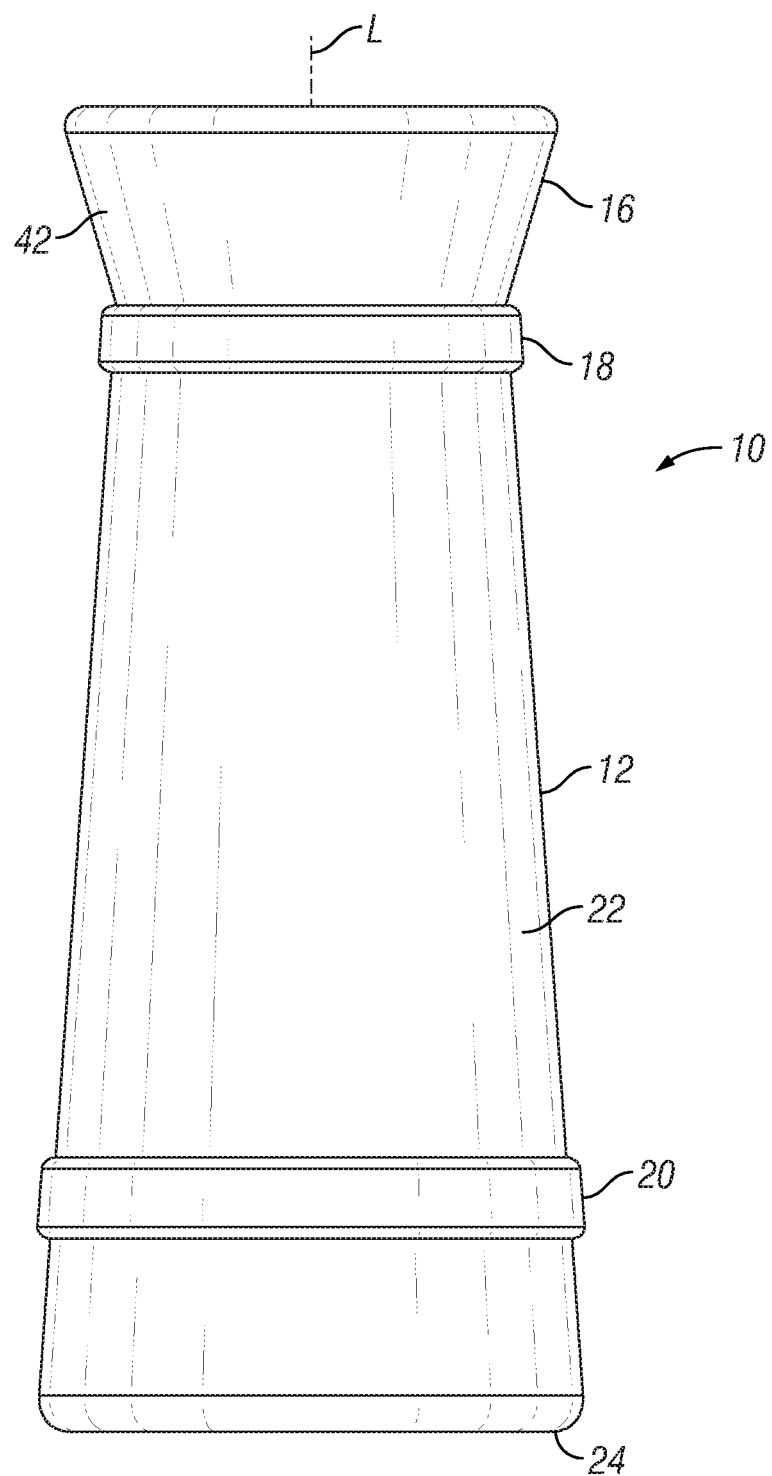
FIG. 2 is a side elevational view of the pet toy infusing device shown in FIG. 1.
Figure 3:
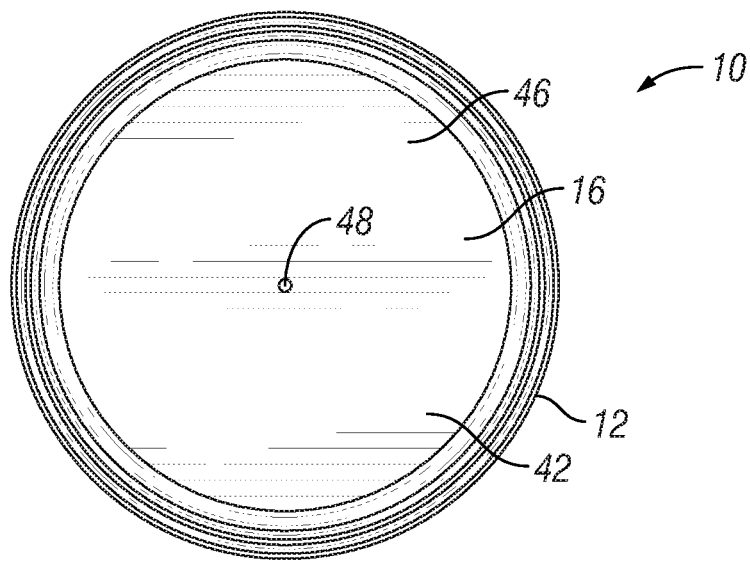
FIG. 3 is a top view of the pet toy infusing device shown in FIG. 1.
Figure 4:
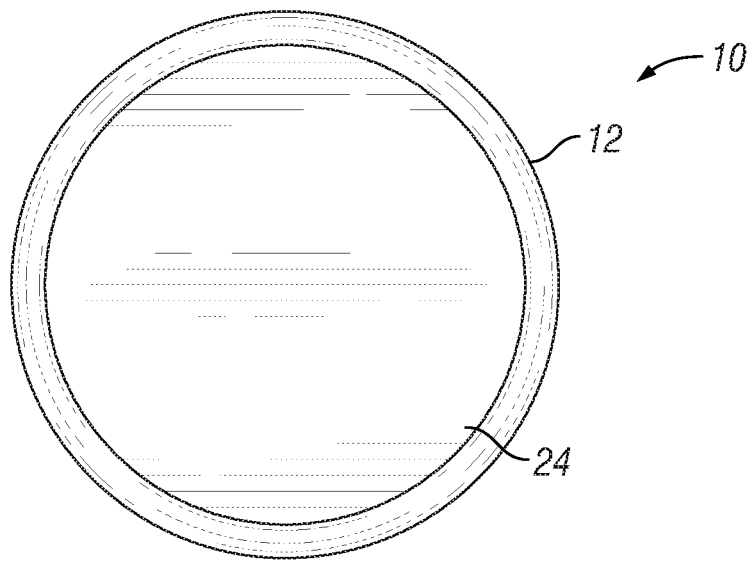
FIG. 4 is bottom view of the pet toy infusing device shown in FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-6, a pet toy infusing device 10 is shown. The pet toy infusing device 10 includes a base 12, a porous insert 14 and a removable cover 16. Additionally, the infusing device can include a ring 18 and a ring 20. When a pet toy PT is inserted into the porous insert 14, the pet toy PT can be quickly infused with a material M, such as catnip.

As shown in FIGS. 1, 2 and 4-6, the base 12 is generally cylindrical or trapezoidal cylindrical and formed from a resilient polymer or elastic material. The base 12 includes an outer surface 22, an inner surface 24 and a bottom portion 26. The inner surface 28 of the bottom portion 26 and the inner surface 24 define a cavity C within the base 12. The base 12 also includes an opening O in the top portion 30. The opening O enables access through the top portion 30 and into the cavity C. The neck portion 32 of the base 12 includes a recessed portion 34 that is configured to receive the ring 18. In other words, near the top portion 30 of the base 12, the base 12 extends inwardly (perpendicularly to the longitudinal axis L of the base 12) and then upwardly (parallel to the longitudinal axis L of the base 12) to form the neck portion 32. The neck portion 32 forms a ledge 36 or area on which the ring 18 can be positioned, so that the ring 18 can support the cover 16.

Additionally, adjacent the neck portion 32 on the inner surface 24, the base 12 includes a plurality of interlocking portions 38 (preferably three interlocking portions). Each of the interlocking portions 38 is generally two parallel protrusions 38a and 38b that extend along the longitudinal axis L of the base 12. It is noted that the interlocking portions 38 on the base 12 can be any suitable structure and any suitable number.

Figure 5:
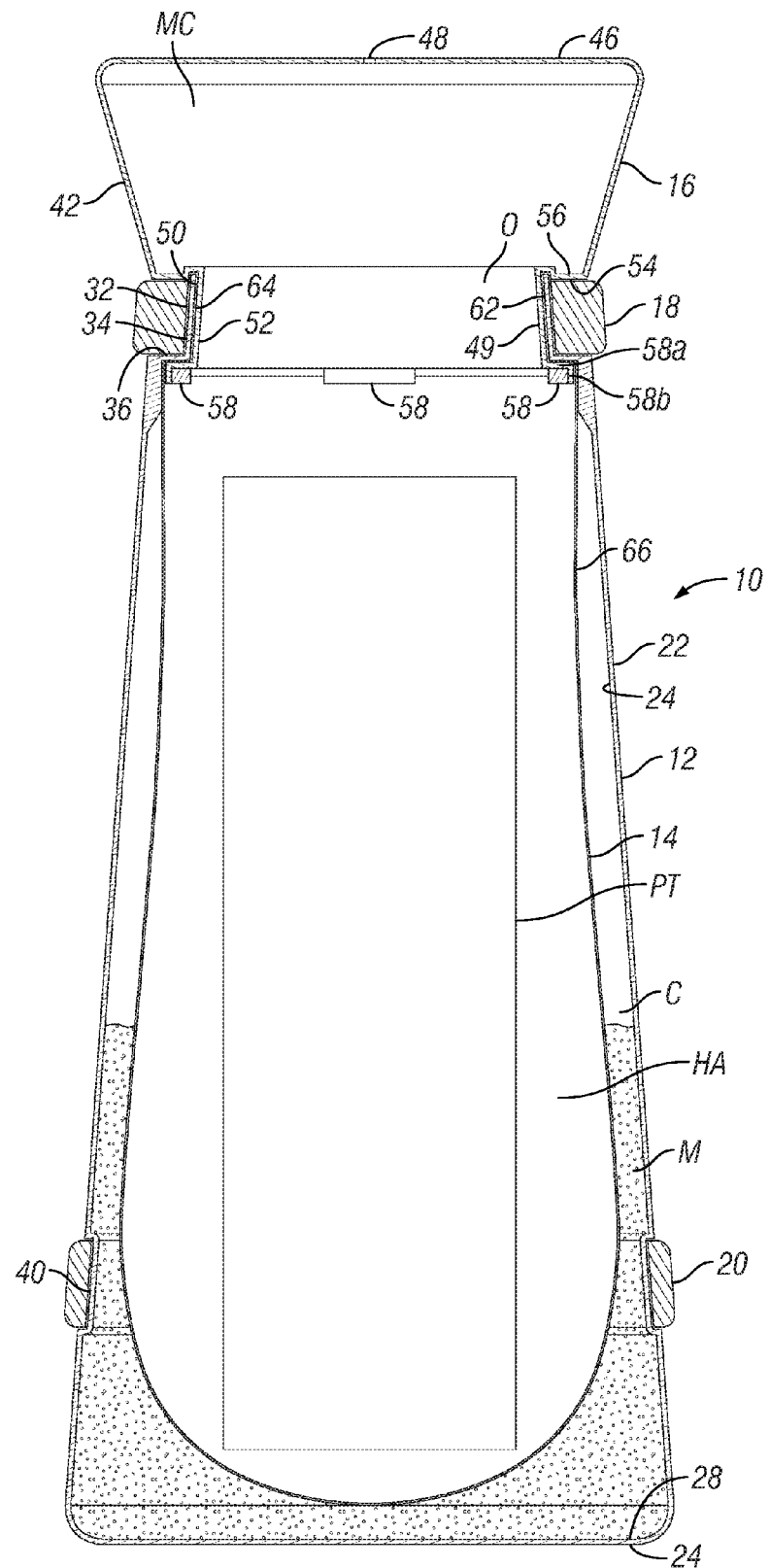
FIG. 5 is an exploded view of the pet toy infusing device shown in FIG. 1.
Figure 6:
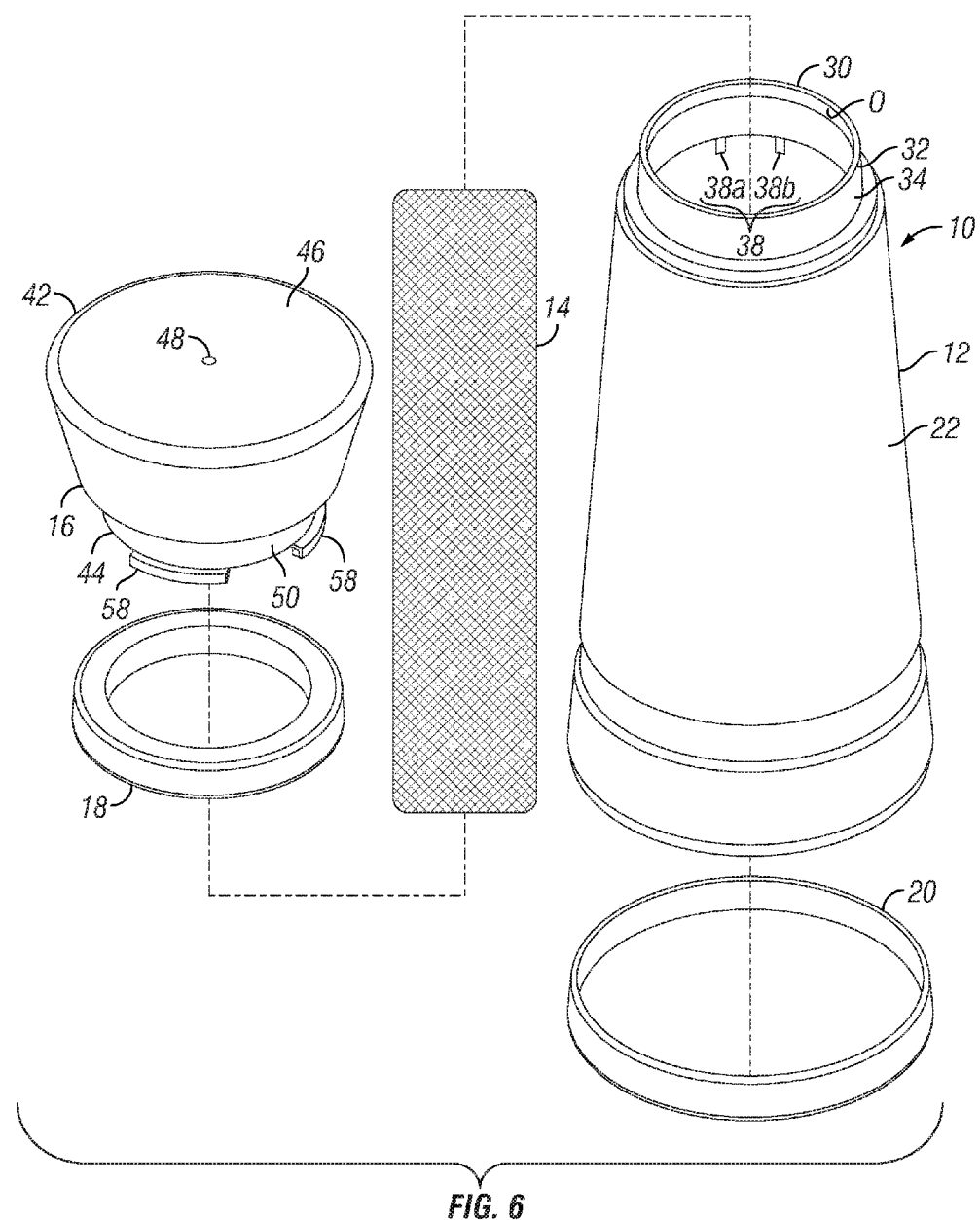
FIG. 6 is a cross sectional view of the pet toy infusing device shown in FIG. 1.
Figure 7:
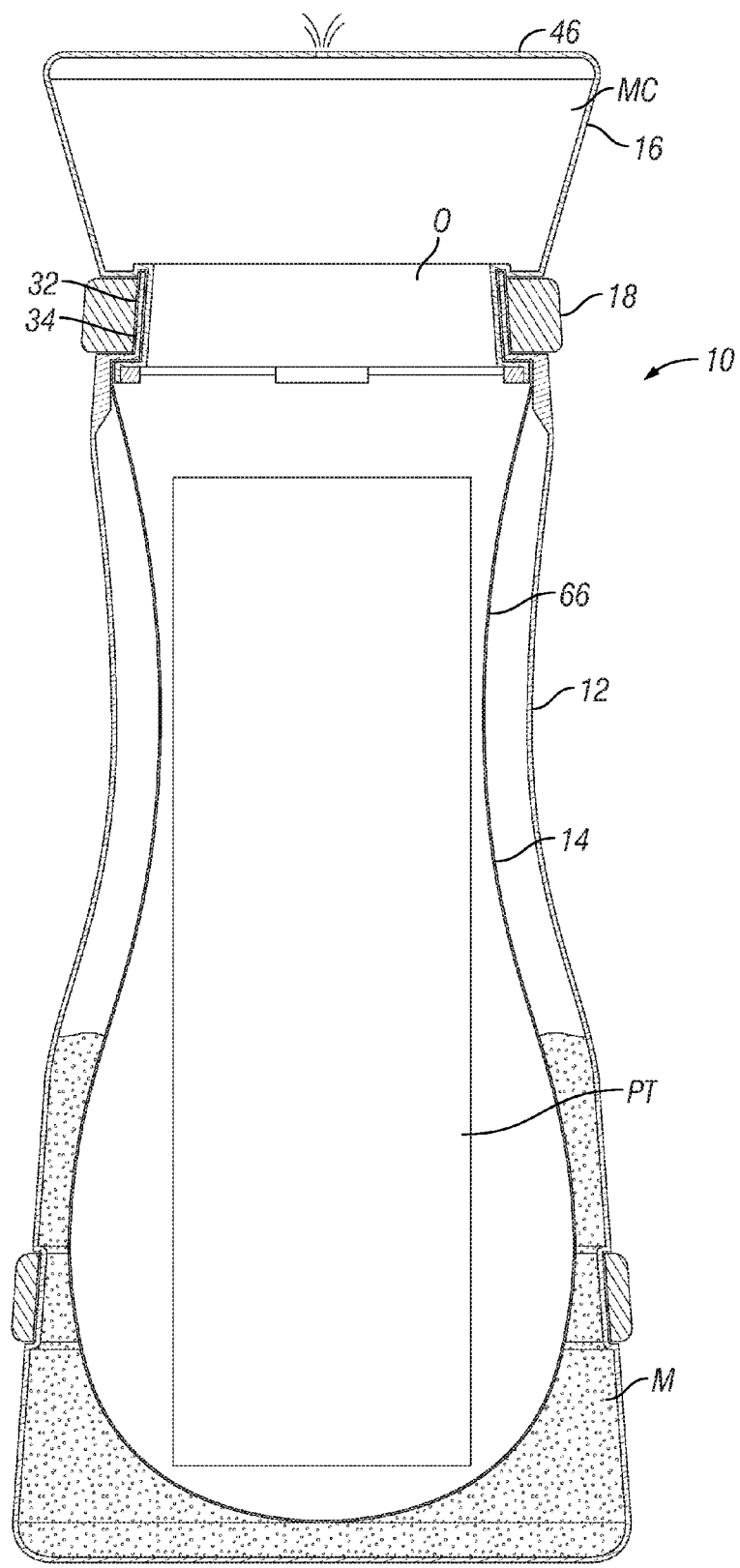
FIG. 7 is a cross sectional view of the pet toy infusing device shown in FIG. 6 in a squeezed state.
Figure 8:
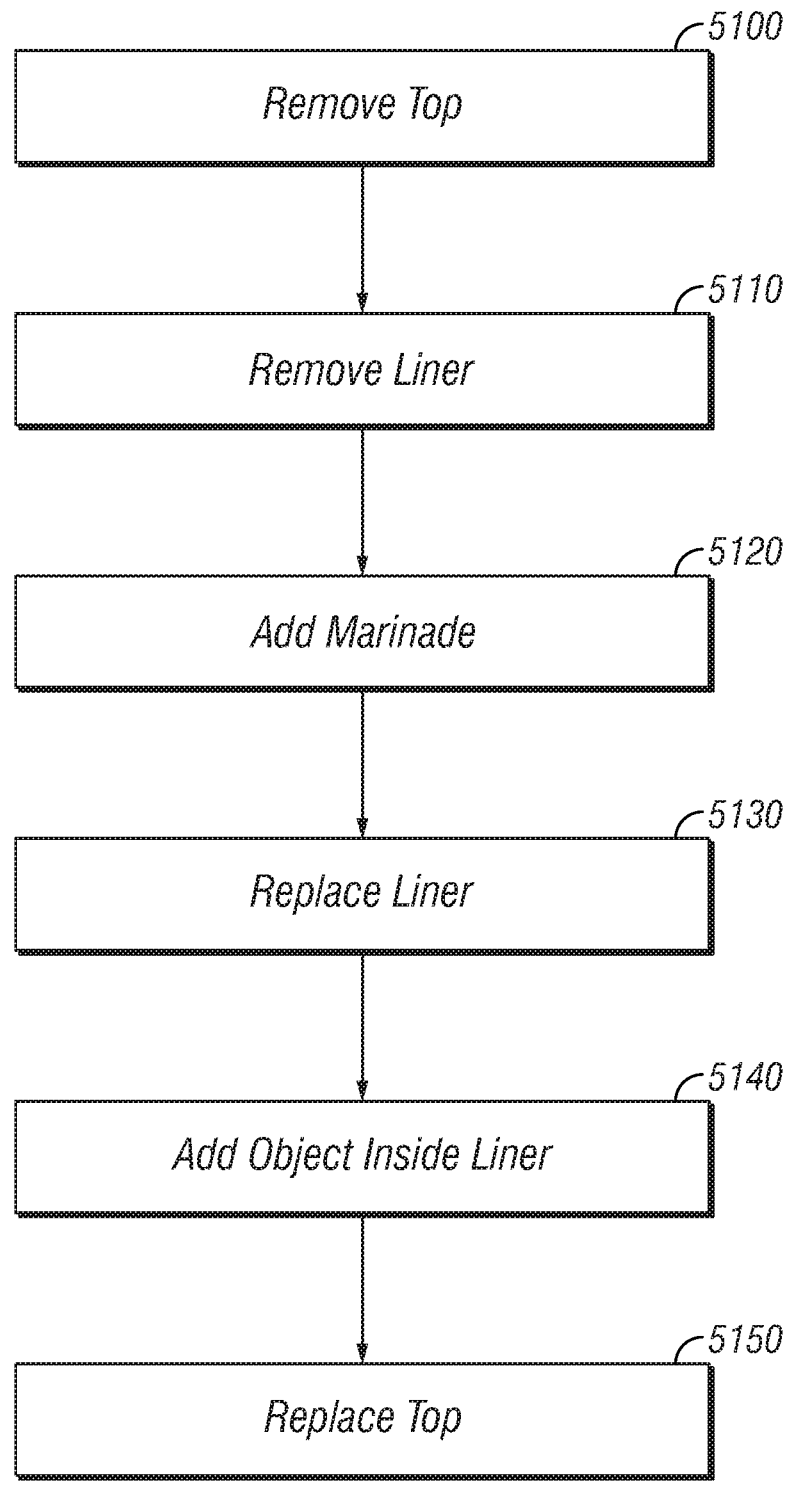
FIG. 8 is a flow chart illustrating the method of infusing a pet toy using the infusing device shown in FIG. 1.

As shown in FIG. 5, the base 12 includes a recess portion 40 in close proximity to the bottom portion 24. The recess portion 40 is configured to receive the ring 20. Both the ring 18 and the ring 20 are preferably formed from the same material as the base 12, but can be any suitable material. The ring 18 facilitates proper positioning of the cover 16 and can be used to support the cover 16 if desired, as shown in FIG. 6.

As shown in FIGS. 1-6, the removable cover 16 includes an upper portion 42 and a lower portion 44. The removable cover 16 can be formed from the same material as the base 12, but can be any suitable material. The upper portion 42 is preferably cylindrical or trapezoidal cylindrical, and is generally hollow. As shown in FIG. 1, the upper surface 46 of the upper portion 42 has a hole or opening 48 generally in the center thereof.

The lower portion 44 is preferably a cylindrical ring having an inner surface 50 and an outer surface 52. The lower portion 44 is separated from the upper portion 42 by a surface 54. The surface 54 extends generally in a direction that is perpendicular to the longitudinal axis L of the base 12. The lower portion 44 extends in a direction that is generally in the direction of the longitudinal axis L of the base 12 when the removable cover 16 is disposed on the base 12. Moreover, the outer surface 52 of the lower portion 44 generally has substantially the same diameter as the inner surface of the neck portion 32. As shown specifically, in FIG. 5, the lower portion 44 generally extends beyond the inner surface of the neck portion 32.

The transition from the upper portion 42 to the lower portion 44 of the cover 16 can define a measuring cavity MC. In the words, an interior surface 56 (e.g., opposite surface 54 of the cover 16) can define the measuring cavity MC. In another embodiment, a measuring cavity MC can be defined by any marking or device in the base 12 or the cover 16, as desire. The measuring cavity MC can have a predetermined volume for a material M to be used to infuse or marinate the pet toy PT in the pet toy infusing device 10. In one embodiment, the predetermined volume of the measuring cavity MC is approximately 10% a volume of the cavity C of the base 12; however, the predetermined volume of the measuring cavity MC can be any suitable amount.

The lower portion 44 includes a plurality (e.g., four) of interlocking portions 58 at an end thereof. In one embodiment, the interlocking portions 58 can have first and second portions 58a and 58b. The first portion 58a of the interlocking portion 58 extends substantially perpendicularly from the outer surface 50 of the lower portion 44, while the second portion 58b extends substantially perpendicular from the first portion 58a in a direction that is generally parallel to the longitudinal axis L of the base 12 and in a direction away from the opening O. The interlocking portions 58 are sized and configured to fit within the protrusions 38a and 38b in the inner surface 24 of the base 12. Such a configuration enables a generally airtight seal to prevent material M from escaping through the opening O.

As shown in FIGS. 5 and 6, the porous insert 14 can be a liner that is preferably a tubular bag with an opening 62 at one end 64. The porous insert 14 is generally porous and is sized and configured to have a pet toy PT or other object inserted thereinto. Accordingly, the porous insert 14 can define a pet toy holding area HA. In one embodiment, the porous insert 14 is formed from woven material that enables small particulates to pass therethough. In other words, the porous insert 14 is formed from a net like material that enables particles of a certain size to pass through, while prohibiting larger particles or particulate to pass therethrough. The porous insert 14 can be sewn together along the sides thereof or formed in any suitable manner. The porous insert 14 has generally the same shape or a similar shape to the cavity C of the base 12. However, when disposed in the cavity C, the porous insert 14 includes at least one exterior 66 surface spaced apart from the cavity C.

The process of infusing a toy with a material M using the infusing device will now be discussed in relation to FIGS. 6-9. First, the cover 16 of the infusing device is removed in step S100. Then the porous insert 14 and the ring 18 are removed (step S110). At this time, the material M is added to the cavity C of the base 12 in step 5120. The material M can be any suitable material, such as nepetalactone (catnip). An object (pet toy PT) is then inserted inside of the porous insert 14 in step S130. The porous insert 14 is then placed inside the cavity C with the object (pet toy PM) disposed inside the porous insert 14 (i.e., in the pet toy holding area HA) in step S140. The porous insert 14 can be folder over the top edge of the base 12 and along the outer surface of the recessed portion 34 as shown in FIG. 5. The ring 18 can then be placed over the porous insert 14 to hold the porous insert 14 in a proper position. The cover 16 is then replaced onto the base 12. The cover 16 and the base 12 substantially encapsulate the pet toy holding area HA while the cover 16 is attached to the base 12. The lower portion 44 is inserted into the opening O and the interlocking members 58 on the cover 16 engage the interlocking members 38 in the base 12. This engagement prohibits rotational movement of the cover 16 and helps hold the cover 16 in position on the base 12. In step S160 the base 12 is manipulated to infuse at least a portion of the material M into or onto the pet toy PT. The base 12 can be manipulated by shaking, rolling, squeezing (FIG. 8), or in any other suitable manner.

Additionally, when the base 12 is manipulated (e.g., squeezed), air can escape through the opening 48 in the cover 16. This prevents the cover 16 from accidentally being removed due to the increased pressure in the cavity C due to the manipulation.

Accordingly, small particulates from the material M can pass through the porous insert 14 and adhere to the pet toy PT. Moreover, the large particles are prevented from passing through the porous insert 14 and remain in the cavity C. As is understood, the pet toy PT in the pet toy holding area HA is infused with an appropriate amount of material M without being inundated and covered with the material M.

Figure 9:
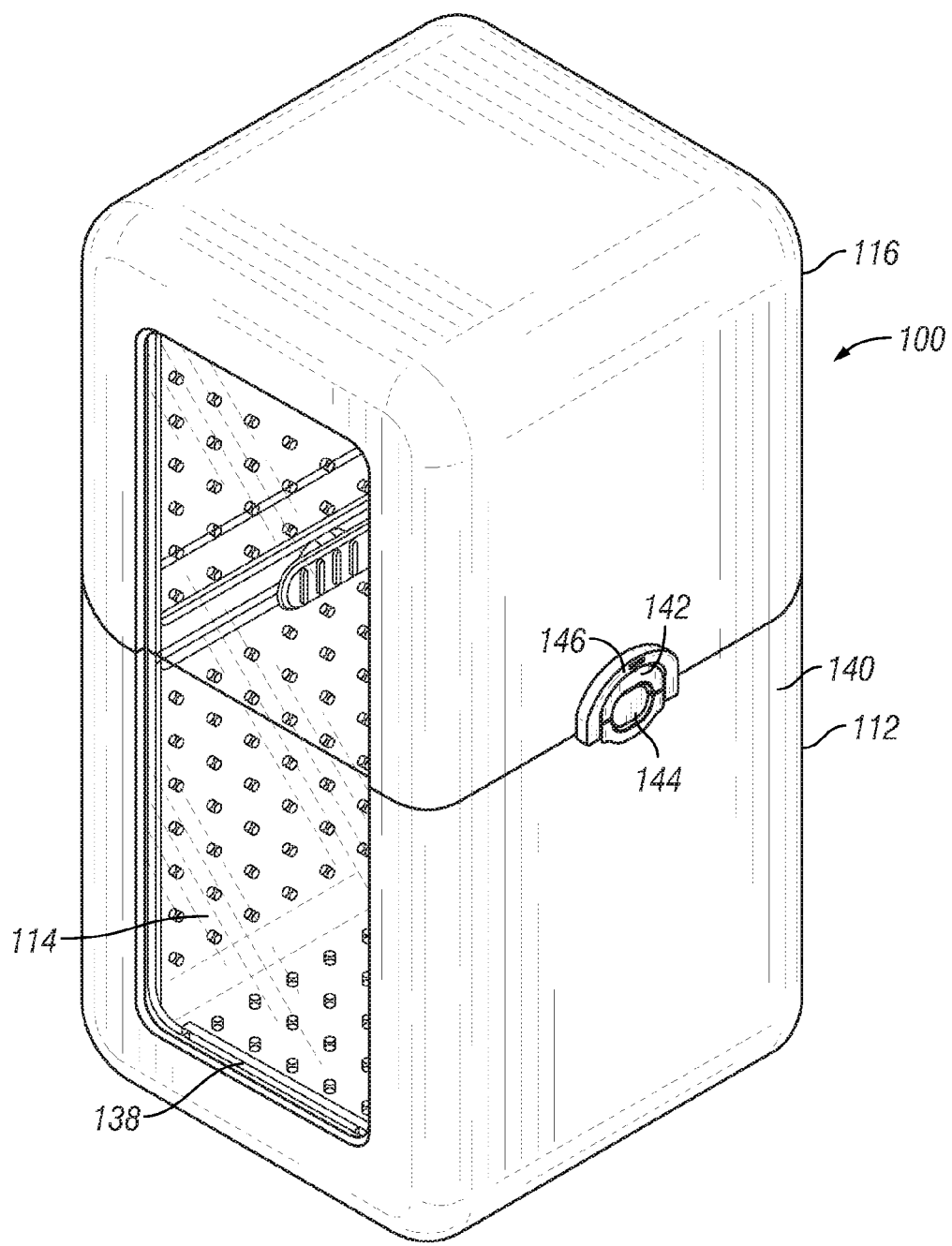
FIG. 9 is a top perspective view of a second embodiment of the present invention.
Figure 10:
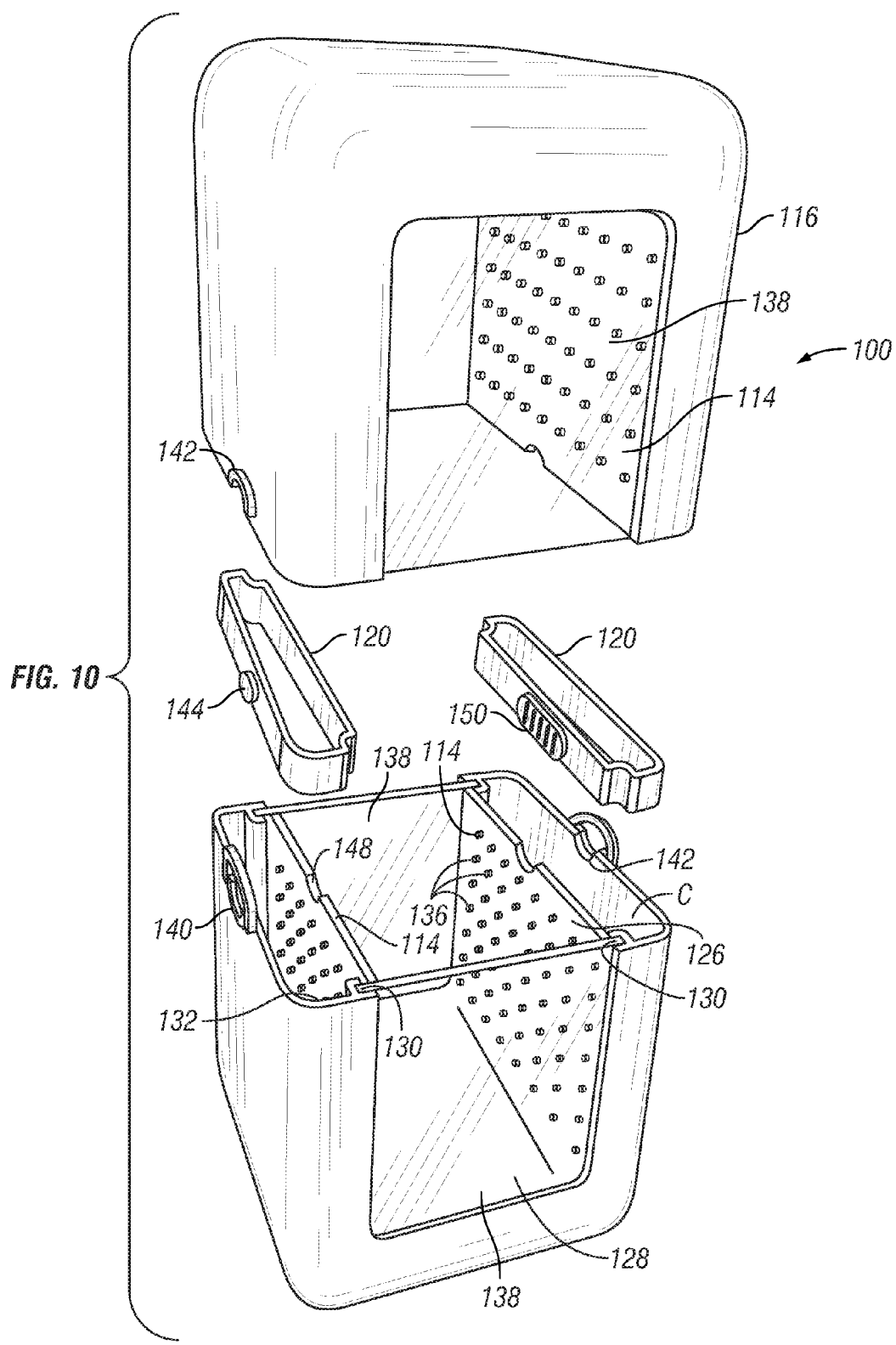
FIG. 10 is an exploded view of the embodiment shown in FIG. 9.
Figure 11:
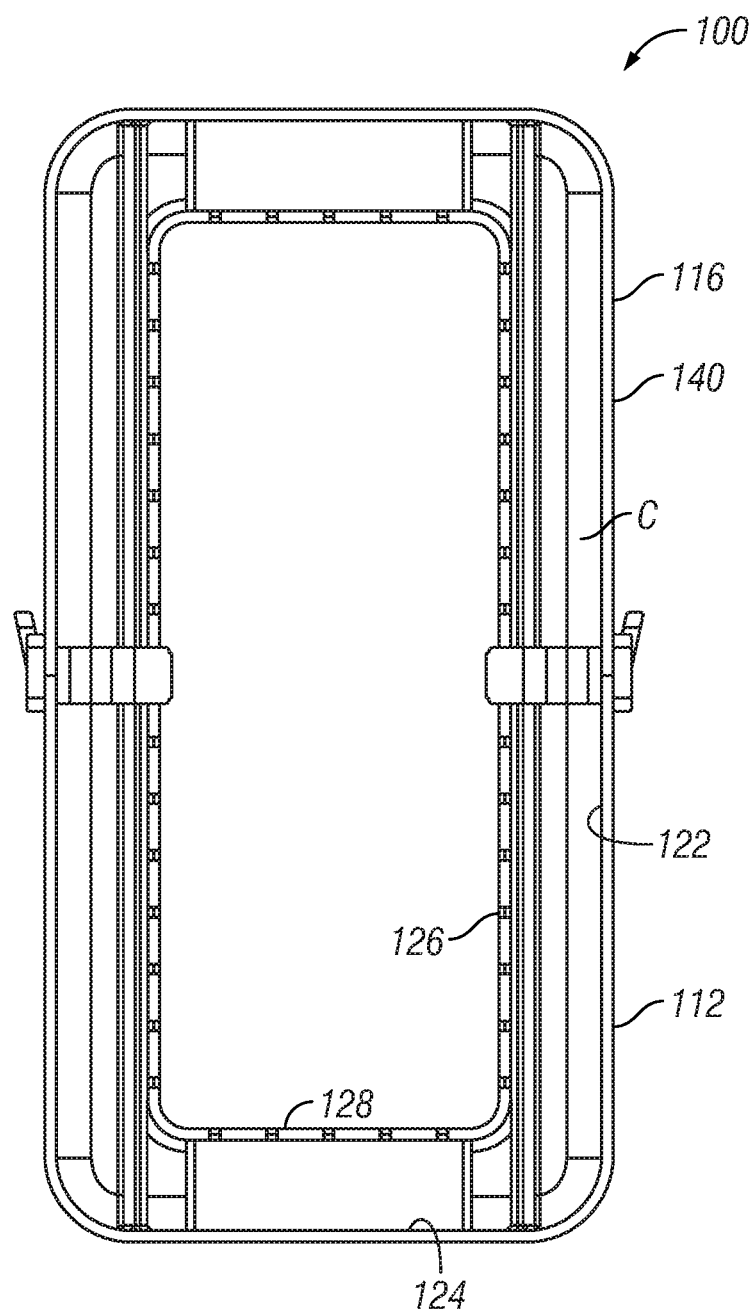
FIG. 11 is a cross sectional view of the embodiment shown in FIG. 9.

A second embodiment of a pet toy infusing device 100 is illustrated in FIGS. 9-11. In pet toy infusing device 100, the base 112 is a rigid plastic cube or box-like structure. The removable cover 116 can be any suitable cover 116. As illustrated in FIGS. 9-11, the cover 116 is basically an inverted base. In other words, the base 112 and the cover 116 are substantially the same. The cover 116 and the base 112 are coupled together using a coupling ring 120. Thus, the ring 120 is at least partially inserted into the cavity C of the base 112.

The porous insert 114 in this embodiment is a preferably a rigid U-shaped insert. The cavity C is formed from an inner wall 122 and bottom surface 124 of the base 112 and the outerwalls 126 and bottom 128 of the porous insert 114. The porous insert 1a4 is a preferably includes a protrusion (not shown) received in a groove 130 on the interior wall 132 of the base 112. The porous insert 114 can include openings 136 or holes therein that would enable small particulates to pass therethough. In other words, the porous insert 14 is formed from a rigid wall with holes that enable particles of a certain size to pass through, while prohibiting larger particles or particulate to pass therethrough.

Each of the base 112 and the cover 116 can have a transparent portion 138 in a sidewall thereof. As shown in FIGS. 9-11, two sides have transparent portions 138, and the transparent portions 138 are inserted into the grooves 130. It is noted that the transparent portion 138 can be any size or shape desired and can be inserted into the base 112 and/or cover 116 in any manner desired.

The outer surface 140 of the base 112 and the cover 116 have a semi-circular cutout 142 that is configured to hold a protrusion 144 of the coupling ring 120. Moreover, at least one of the semi-circular cutout 142 (interlocking portion) has a semi-circular pivotal ring 146 (interlocking portion) attached thereto.

The coupling ring is a plastic ring that has a configuration that enables the ring to enable the cover 116 to couple to the base 112. In one embodiment, the circular protrusion is configured to mate with the semi-circular cutout 148 and a T-shaped protrusion 150 that coupled to a cutout 148 in the porous insert 14. Thus, the coupling ring 120 is supported on two separate sides by both the base 112 and the cover 116.

In this embodiment the cavity C is a generally U-shaped cavity C that extends from one side of the base 112 and cover 116, around the top and bottom and to the other side of the base 112 and cover 116. In this embodiment, it is not necessary to remove the porous insert 14 to insert the material M, but the porous insert 14 can be removed, if desired.

Further, once the cover 116 is positioned in the base 112, the semi-circular pivotal ring 146 can be pivoted to engage the semi-circular cutout 142 on the opposite member (i.e., the other of the base 112 and cover 116). Once the semi-circular pivotal ring 146 engages the semi-circular cutout 142 on both sides, the cover 116 and the base 112 are coupled together and can be inverted without spilling any of the material M.

The embodiment described herein disclose a device that quickly and effectively can infuse a material M (e.g., catnip) to a pet toy PT without contaminating the toy.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "component" or "element" when used in the singular can have the dual meaning of a single part or a plurality of parts. Accordingly, these terms, as utilized to describe the present invention should be interpreted relative to a pet bowl formed of a bulk molding compound.

The term "configured" as used herein to describe a component, section or part of a device means that the component, section or part is designed to carry out the desired function.

The terms of degree, such as "substantially" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

I claim:

1. A pet toy infusing device comprising:
    a base including a cavity, and having an opening configured to enable access to the cavity;
    a removable cover configured to cover the cavity; and
    a porous insert removably disposed inside of the cavity between the base and the cover, the porous insert having an interior surface defining a pet toy holding area, and being configured to prevent a material disposed inside the cavity of the base from entering the pet toy holding area, while enabling a pet toy disposed in the pet toy holding area to be infused with the material.

2. The pet toy infusing device according the claim 1, wherein
    the porous insert includes at least one exterior surface spaced apart from the cavity.

3. The pet toy infusing device according to claim 1, further comprising:
    a ring disposed between the base and the cover.

4. The pet toy infusing device according to claim 3, wherein
    the ring is configured to support the cover while the cover is covering the cavity.

5. The pet toy infusing device according to claim 1, wherein
    the base and cover include an elastic material.

6. The pet toy infusing device according to claim 1, wherein
    the base and the cover include a rigid material.

7. The pet toy infusing device according to claim 1, wherein
    the base includes a first interlocking portion,
    the cover includes a second interlocking portion configured to engage the first interlocking portion,
    the first interlocking portion and the second interlocking portion removably attaching the cover to the base and preventing rotation of the cover relative to the base, while the first interlocking portion engages the second interlocking portion.

8. The pet toy infusing device according to claim 7, wherein
    the base includes a third interlocking portion,
    the cover includes a fourth interlocking portion configured to engage the first interlocking portion,
    the third interlocking portion and the fourth interlocking portion removably attaching the cover to the base while the first interlocking portion engages the second interlocking portion.

9. The pet toy infusing device of claim 1, wherein the cover includes a vent.

10. The pet toy infusing device of claim 1, wherein the cover and the base substantially encapsulate the pet toy holding area while the cover is attached to the base.

11. The pet toy infusing device of claim 1, wherein the porous insert comprises a porous fabric.

12. The pet toy infusing device of claim 1, wherein the porous insert comprises a rigid material including a plurality of holes.

13. The pet toy infusing device of claim 1, wherein the base includes a window.

14. The pet toy infusing device of claim 1, wherein the cover includes a measuring cavity defined by an interior surface of the cover,
    the measuring cavity having a predetermined volume for a marinade used to marinate a pet toy in the pet toy infusing device.

15. The pet toy infusing device of claim 1, wherein the predetermined volume of the measuring cavity is approximately 10% a volume of the cavity of the base.

16. A method of infusing a pet toy, the method comprising:
    measuring a material;
    placing the material into a base of an infusing device;
    placing a porous insert into the base of the infusing device;
    providing a pet toy in the porous insert;
    closing the infusing device; and
    manipulating the infusing device to cause a portion of the material to be applied to the pet toy.

* * * * *